(12) United States Patent
Biadsy et al.

(10) Patent No.: US 9,805,713 B2
(45) Date of Patent: Oct. 31, 2017

(54) ADDRESSING MISSING FEATURES IN MODELS

(71) Applicant: Google Inc., Mountain View, CA (US)

(72) Inventors: Fadi Biadsy, New York, NY (US); Diamantino Antonio Caseiro, Philadelphia, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/681,652

(22) Filed: Apr. 8, 2015

(65) Prior Publication Data

US 2016/0267904 A1 Sep. 15, 2016

Related U.S. Application Data

(60) Provisional application No. 62/133,236, filed on Mar. 13, 2015.

(51) Int. Cl.
| | |
|---|---|
| *G10L 15/02* | (2006.01) |
| *G10L 15/08* | (2006.01) |
| *G10L 15/26* | (2006.01) |
| *G10L 15/30* | (2013.01) |
| *G10L 15/183* | (2013.01) |

(52) U.S. Cl.
CPC ............ *G10L 15/08* (2013.01); *G10L 15/183* (2013.01); *G10L 15/26* (2013.01); *G10L 15/30* (2013.01)

(58) Field of Classification Search
CPC ....... G10L 15/22; G10L 15/26; G10L 15/063; G10L 15/18; G10L 15/08; G10L 15/183; G10L 15/02; G10L 15/065; G10L 15/187; G10L 15/197; G10L 15/06; G10L 15/00

USPC ............... 704/1–10, 235–236, 240, 244, 275
See application file for complete search history.

(56) References Cited

U.S. PATENT DOCUMENTS

| | | | |
|---|---|---|---|
| 6,678,415 B1 * | 1/2004 | Popat ...................... | G06K 9/72 382/226 |
| 7,599,893 B2 | 10/2009 | Sapir et al. | |
| 8,583,416 B2 | 11/2013 | Huang et al. | |
| 8,798,984 B2 | 8/2014 | Cancedda et al. | |
| 2009/0030687 A1 * | 1/2009 | Cerra .................... | G10L 15/065 704/243 |
| 2010/0191685 A1 | 7/2010 | Sapir et al. | |
| 2011/0137653 A1 * | 6/2011 | Ljolje .................. | G10L 15/183 704/255 |

(Continued)

FOREIGN PATENT DOCUMENTS

WO 2010/085773 7/2010

*Primary Examiner* — Eric A Rust
*Assistant Examiner* — Stephen Brinich
(74) *Attorney, Agent, or Firm* — Fish & Richardson P.C.

(57) ABSTRACT

Systems and methods for addressing missing features in models are provided. In some implementations, a model configured to indicate likelihoods of different outcomes is accessed. The model includes a respective score for each of a plurality of features, and each feature corresponds to an outcome in an associated context. It is determined that the model does not include a score for a feature corresponding to a potential outcome in a particular context. A score is determined for the potential outcome in the particular context based on the scores for one or more features in the model that correspond to different outcomes in the particular context. The model and the score are used to determine a likelihood of occurrence of the potential outcome.

20 Claims, 4 Drawing Sheets

(56) References Cited

U.S. PATENT DOCUMENTS

2011/0295590 A1* 12/2011 Lloyd .................. G10L 15/065
704/8
2014/0200878 A1    7/2014 Mylonakis et al.

* cited by examiner

ADDRESSING MISSING FEATURES IN MODELS

RELATED APPLICATION

This application claims priority to U.S. Provisional Patent Application Ser. No. 62/133,236, filed Mar. 13, 2015, which is hereby incorporated by reference in its entirety.

TECHNICAL FIELD

The present disclosure relates to modeling, including language modeling for speech recognition and other natural language processing tasks.

BACKGROUND

Statistical models are used in a variety of applications. In some instances, language models are used to estimate the likelihoods that speech sequences will occur.

SUMMARY

Technical solutions (e.g., computing systems, apparatus, methods, and non-transitory computer readable storage media) for addressing missing features in models are provided in the present disclosure.

In one general aspect, a method includes: receiving data indicating a candidate transcription for an utterance and a context for the utterance; accessing a language model that includes a respective score for each of a plurality of features, each feature corresponding to a word or phrase occurring in an associated context that includes one or more preceding words; determining that the language model does not include a score for a feature corresponding to the candidate transcription in the particular context; determining a score corresponding to the candidate transcription in the particular context, wherein the score is determined based on one or more scores included in the language model for one or more of the plurality of features that are associated with the particular context; determining, using the language model and the determined score, a probability score indicating a likelihood of occurrence of the candidate transcription in the particular context; selecting, based on the probability score, a transcription for the utterance from among a plurality of candidate transcriptions; and providing the selected transcription to a client device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

In some implementations, the language model is a log-linear model.

In some implementations, determining the score corresponding to the candidate transcription in the particular context includes: identifying features in the language model that correspond to different words or phrases occurring in the particular context; and accessing scores in the language model for the identified features.

In some implementations, the identified features constitute an exhaustive set of features of the model that are associated with the particular context.

In some implementations, determining the score corresponding to the candidate transcription in the particular context further includes: identifying the minimum score from among the accessed scores for the identified features; and determining the score corresponding to the candidate transcription in the particular context based on the identified minimum score.

In some implementations, determining the score corresponding to the candidate transcription in the particular context includes determining the score by subtracting one or more predefined values from the minimum score.

In some implementations, (i) identifying the features in the language model that correspond to different words or phrases occurring in the particular context and (ii) accessing the scores for the identified features are performed in response to determining that the language model does not include a score for a feature corresponding to the candidate transcription in the particular context.

In some implementations, (i) identifying the features in the language model that correspond to different words or phrases occurring in the particular context and (ii) accessing the scores for the identified features are performed prior to receiving the candidate transcription for the utterance.

In some implementations, determining the score corresponding to the candidate transcription in the particular context includes: accessing a stored score that is assigned to the particular context, the stored score being assigned to the particular context prior to the utterance being spoken; and using the stored score as the score corresponding to the candidate transcription;

In some implementations, determining the score corresponding to the candidate transcription in the particular context includes determining a score indicating a likelihood of occurrence that is less than or is equal to the lowest likelihood of occurrence indicated by scores in the language model that are assigned to features that correspond to the particular context.

In some implementations, the language model is a log-linear model, and the accessed scores for the identified features are weights of the log-linear model that are associated with the identified features.

In some implementations, the language model has been trained to indicate a likelihood of a word or phrase occurring in a language sequence based at least in part on one or more prior words in the language sequence.

In some implementations, each of the plurality of features corresponds to a respective language sequence that occurs in training data that was used to train the language model; and wherein the candidate transcription and the particular context form a language sequence that was not included in the training data that was used to train the model.

In some implementations, the techniques include: pre-computing a minimum score for each of multiple contexts while training the language model; and normalizing scores for features in the language model using the pre-computed minimum scores.

In another general aspect, a method includes, accessing a model configured to indicate likelihoods of different outcomes. The model includes a respective score for each of a plurality of features, and each feature corresponds to an outcome in an associated context. The method further includes, determining that the model does not include a score for a feature corresponding to a potential outcome in a particular context; identifying features in the model that correspond to different outcomes in the particular context; assigning, to the potential outcome in the particular context, a score based on scores for the identified features; and using the model and the score to determine a likelihood of occurrence of the potential outcome.

In some implementations, the model is a log-linear model.

In some implementations, the model includes has been trained to indicate a likelihood of a word occurring in a speech sequence based at least in part on one or more prior words in the speech sequence.

In some implementations, the scores for the identified features are weights associated with the identified features.

In some implementations, the different outcomes correspond to words observed in training data that was used to train the model is trained.

In some implementations, the potential outcome identifies one or more words that have not been observed in the particular context in training data used to train the model.

In some implementations, the method optionally includes: determining the score for the potential outcome in the particular context by subtracting a predefined value from the value.

In some implementations, the score assigned to the potential outcome in the particular context is an n-gram backoff score.

In some implementations, the method optionally includes: obtaining audio data for an utterance by a user; determining a plurality of candidate transcriptions for the audio data; and selecting a candidate transcription from among the plurality of candidate transcriptions using the model and the assigned score.

In some implementations, accessing the model is responsive to obtaining audio data for the utterance by the user.

In some implementations, the method optionally includes: transcribing a portion of the audio data into a speech sequence having one or more words; determining the particular context in accordance with the one or more words; and determining a next word to the speech sequence based on the likelihood of occurrence of the potential outcome.

In some implementations, obtaining audio data for the utterance by the user occurs after that likelihood of occurrence of the potential outcome is determined.

In some implementations, the method optionally includes: pre-computing a minimum score after training the model; and modifying scores for the identified features in accordance with the pre-computed minimum score.

In some implementations, the identified features constitute an exhaustive set of features of the model that are associated with the particular context.

In another general aspect, a method includes, accessing a log-linear language model configured to indicate likelihoods of different words or phrases occurring in a sequence based at least in part on prior words in the sequence. The log-linear language model includes a respective weight for each of a plurality of features, and each feature corresponds to a word or phrase occurring in an associated context that specifies one or more preceding words. The method includes receiving data indicating a candidate transcription for an utterance, the candidate transcription including a particular word or phrase occurring in a particular context that specifies one or more words before the particular word or phrase. The method includes determining that the log-linear language model does not include a weight for a feature corresponding to the particular word or phrase in the particular context. The method includes, in response to the determination, determining a weight for the feature corresponding to the particular word or phrase in the particular context, the determined weight indicating a likelihood of occurrence that is less than or is equal to the lowest likelihood of occurrence indicated by weights assigned to features of the log-linear language model that correspond to the particular context. The method includes determining, using the log-linear language model and the determined weight, a probability score indicating a likelihood of occurrence of the particular word or phrase. The method includes selecting, based on the probability score, a transcription for the utterance from among a plurality of candidate transcriptions. The method includes providing the selected transcription.

In some implementations, the method further includes determining, based on the particular one or more words and the particular context, feature scores that indicate that a subset of the one or more of the plurality of features of the log-linear language model to be activated. Determining the probability score comprises determining a posterior probability for the particular word or phrase given the particular context based on (i) the determined weight and (ii) weights for the features in the subset.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numerals refer to corresponding parts throughout the drawings.

DETAILED DESCRIPTION

Figure 1:
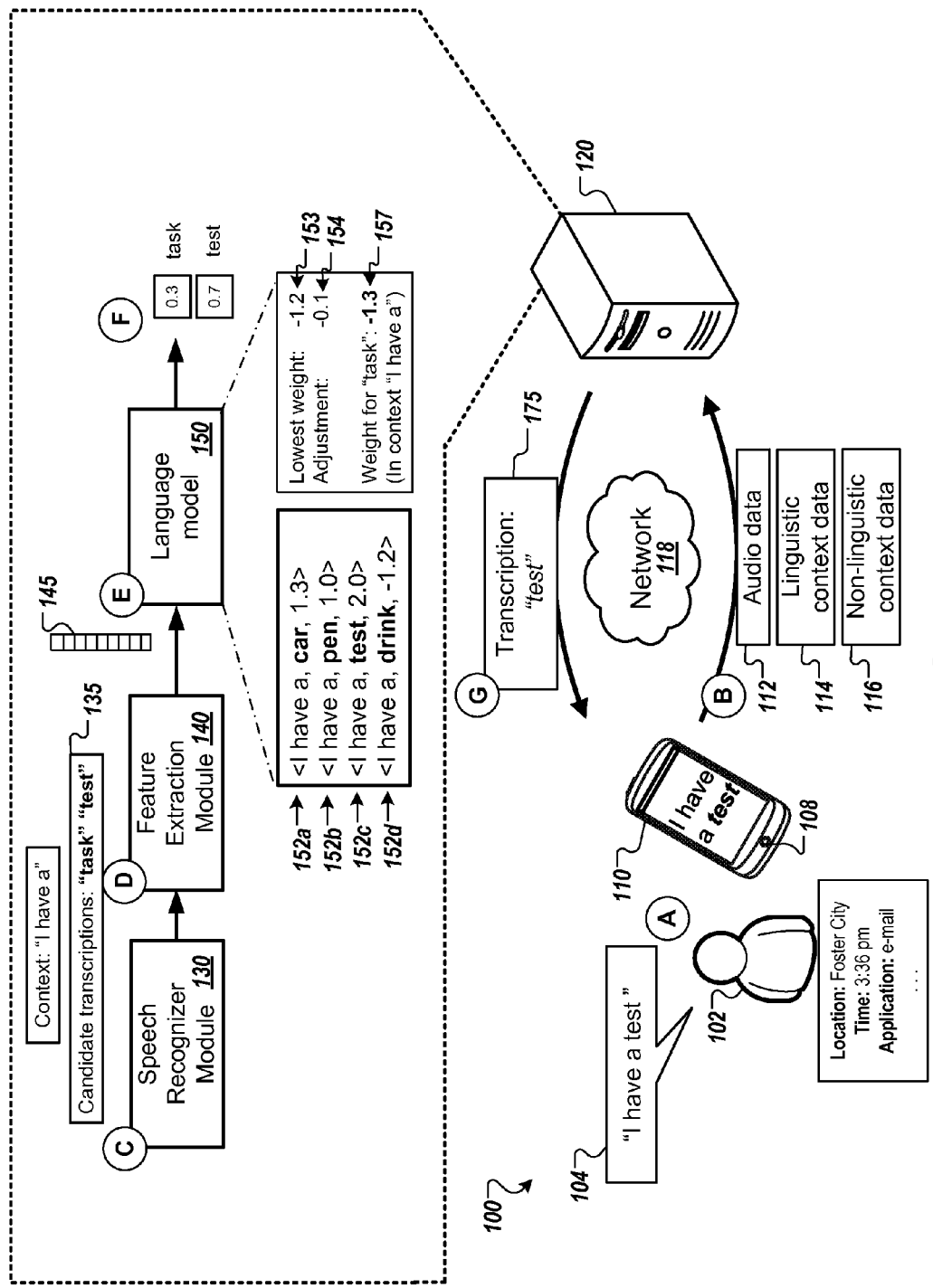
FIG. 1 is a diagram that illustrates an example system for speech recognition in accordance with a language model.

Log-linear models and many other models often have a set of features that is defined based on outcomes observed in a set of training data. Different features of a log-linear model may respectively represent different combinations of outcomes and the contexts in which the outcomes occur. For example, an individual feature may correspond to a particular outcome occurring in a particular context. When a log-linear model is generated and trained, features are included in the model according to the outcomes and associated contexts that are observed in the training data. In some cases the contexts includes non-linguistic contexts such as current time of day, a user location, or user demographics stored in a user profile.

After training, use of the model may involve assessing outcomes and/or contexts that were not observed during training and thus do not have corresponding features in the model. Due to various factors discussed below, some models may inaccurately estimate the likelihood of occurrence of an outcome when a corresponding feature is not included in the model. In particular, some models may overestimate the likelihoods for unseen outcomes and contexts, and incorrectly indicate likelihoods that are higher than for combinations of outcomes and contexts that were actually observed during training.

Various techniques are disclosed herein to improve the accuracy of models when dealing with combinations of outcomes and contexts for which features are not defined in the model. In some implementations, when a potential outcome and context have no corresponding feature in the model, a weight or score for the missing feature can be set equal to or less than the lowest weight assigned for outcomes actually observed in that context. The weight for an observed combination of outcome and context can be determined dynamically, as the model is used. Alternatively, weights can be pre-computed and stored, and then later used when a model evaluates potential outcomes and contexts that do not have corresponding features. The weights used to address missing features can also be context-dependent. That is, the weight used for an unobserved outcome in a first context may be different from the weight used for an unobserved outcome in a second context. These techniques can be applied to any appropriate field where models and machine learning are used, including language modeling, machine translation, speech recognition, parsing, object recognition, natural language processing, sentiment analysis, financial analysis, social behavior analysis, and so on.

In particular, the techniques may be especially useful to address machine learning and modeling scenarios where parameters are sparse. For example, a model may have parameters explicitly defined for only a proper subset of the potential outcomes or the potential combinations of outcomes and context that the model may encounter. As another example, to save space, a model may store parameter values for only a proper subset of the parameters of the model. The techniques discussed herein may enhance modeling in many scenarios involving with parameter sparsity.

In some implementations, a speech recognition system uses a log-linear language model to recognize speech. The language model may be used to determine words that occur after a leading phrase in a speech sequence. For example, after collecting audio data (via a microphone) from a user, the speech recognition system transcribes the audio data into a sentence that includes several words. In some cases, the speech recognition system transcribes a next word in the sentence based on an existing context, such as a leading phrase (e.g., previously transcribed words in the same sentence). As a non-limiting example, a user may have spoken the phrase "I have a." The speech recognition system can use this initial phrase as a linguistic context to recognize a next word by consulting a language model, which can indicate likelihoods that different words will be the next word in the sequence.

In some cases, a log-linear language model stores weights assigned to different outcomes (e.g., different words) occurring in the context. The model generally indicates likelihoods for potential outcomes in accordance with weights assigned to these outcomes. In the above example, given the context of the phrase "I have a," the language model may include the following potential next words and their associated weights: <car, 2.1>; <pen, 1.2>; and <drink, −1.1>.

In some cases, the speech recognition system, based on the existing context (the leading phrase "I have a"), considers the word "philosophy" a potential next word. However, when the language model does not include an assigned weight to the word "philosophy" (for example, because the model does not define a feature for the word "philosophy" in the context, or does not have a weight for the word "philosophy" in the context). In a typical log-linear model, this outcome would be implicitly considered to have a "0" weight (e.g., as if there were a zero-weighted feature <philosophy, 0>).

In some cases, based on the fact that the word "philosophy" is implicitly treated as having "0" weight, the language model considers the word "philosophy" is more likely outcome than another word, e.g., "drink," which was actually observed in the context and should have a higher likelihood. Because the weight assigned to the word "drink" (−1.1) is less than the implicit weight for the word "philosophy" (0), a model could incorrectly indicate that "philosophy" is a more likely outcome in the context.

In some cases, this is not a desired outcome given the context. Because of the implicit "0" weight, the speech recognition system has effectively—albeit unintendedly—determined that, given a particular context, a word absent from a language model is more relevant than a word having a negative weight. The unintended consequences may include inaccurate speech recognition results.

To this end, a backoff strategy can be provided to address missing features in a language model. For example, in some cases, a minimum weight is calculated for a missing feature based on weights of other features corresponding to the particular context in the language model. For example, the minimum weight can be equal to or less than the lowest weight for the features corresponding to the particular context. The minimum weight is automatically assigned to words that are not presently assigned a weight with respect to the particular context in the language model. By implementing these backoff strategies, more accurate speech recognition results can be provided. Additional details of implementations are now described in relation to the Figures.

As used herein, the term context can refer to any of a variety of types of information or input to the model. For example, in language modeling, context is not necessarily limited to a linguistic sequence occurring before a word or outcome being predicted. As discussed below, words occurring after an outcome to be predicted, or various aspects of non-linguistic context may additionally or alternatively be indicated to a model. Thus, elements of context can include any appropriate input to a model. Other examples of context that may be used can include data indicating time of day, geographic location, user demographics, and so on. Any type of information can be defined to be an element of a context used in predictive modeling.

FIG. 1 is a diagram that illustrates an example system 100 for speech recognition with a language model.

The system 100 includes a client device 110, a computing system 120, and a network 118. In the example, the computing system 120 receives audio data 112 and context data from the client device 110. In some implementations, the client device 110 receives the audio data 112, via an audio input module 108 (such as a microphone), from a user. In some implementations, the context data may include linguistic context 114, non-linguistic context data 116, or both. In some implementations, linguistic context 114 and/or non-linguistic context data 116 may already be known by the computing system 120, for example, through recognition of prior words by the computing system 120 or through data received from other sources, and thus the context data may not need to be provided by the client device 110.

In FIG. 1, the computing system 120 uses a language model 150 to determine a transcription for the audio data 112. In some implementations, the language model is a log-linear model or maximum entropy model. In some implementations, the language model a support vector machine model, a neural network, a set of classifiers, or another type of model. The figure shows stages (A) to (G) which illustrate a flow of data.

In some implementations, the client device 110 is, for example, a desktop computer, a laptop computer, a cellular phone, a smart phone, a tablet computer, a music player, an e-book reader, a wearable computer, a navigation system, or other devices. The functions performed by the computing system 120 can be performed by individual computer systems or can be distributed across multiple computer systems, e.g., one or more server systems. The network 118 can be wired or wireless or a combination of both, and may include private networks and/or public networks, such as the Internet.

In the example of FIG. 1, during stage (A), a user 102 speaks and the client device 110 detects the utterance 104 of the user 102. For example, the client device 110 may record the utterance 104 using a microphone 108. The user 102 may provide the utterance 104 as voice input to a variety of applications, for example, a search application, an e-mail application, a calendar application, a map application, a navigation application, and so on. Thus, the utterance 104 may represent a variety of user inputs, for example, a query, a message recipient, the body of a message, a voice command, an address, a phone number, and so on.

In the illustrated example, the user 102 is dictating the contents of an e-mail message while an "e-mail" application is running on the client device 110. The user 102 previously entered the text "I have a" as part of the message, and the utterance 104 includes the word "test" as further input to add to the message.

During stage (B), the client device 110 collects information and sends the information to the computing system 120 over the network 118. The information may be sent with, for example, a request for a transcription of the utterance. For example, the client device 102 sends audio data 112 for the utterance 104 to the computing system 120. The audio data 112 may be, for example, a recording of the utterance 104, or information derived from the detected utterance 104, such as filterbank energy values, mel-frequency cepstral coefficients (MFCCs), or scores for other acoustic features.

The client device 110 may also send linguistic context data 114 that indicates a linguistic context for the utterance 104. For example, the client device 110 may provide data that indicates the words that the utterance 104 follows. In the illustrated example, the linguistic context data 114 indicates the words "I have a" that immediately precede the utterance 104. In some implementations, the linguistic context data 114 provides a specific amount of text, for example, the previous one, two, three, five, or ten words, or the text recognized within a predetermined amount of time. The linguistic context may include words that were previously spoken by the user and are recognized, and/or text that was entered or accessed in another manner. For example, a user could open a text file, place a cursor at a particular position in the text, and begin speaking to insert additional text. Some amount of text before the cursor may be provided as linguistic context, regardless of how the text in the file was entered.

The client device 110 may also determine and send non-linguistic context data 116 to indicate a non-linguistic context for the utterance 104. The non-linguistic context data may indicate, for example, characteristics of the environment in which the utterance 104 is spoken. The non-linguistic context data 104 can indicate factors related to the physical environment of the user 102 or client device 110, such as geographical location, time, temperature, weather, or ambient noise. The non-linguistic context data 104 can provide information about the physical state of the client device 110, for example, whether the device 110 is moving or stationary, the speed of movement of the device 110, whether the device 110 is being held or not, a pose or orientation of the device 110, whether or not the device 110 is connected to a docking station, and/or the type of docking station to which the client device 110 is connected. The non-linguistic context data 104 can provide information about the operating state of the client device 110, for example, an identifier for an application running on the client device 110, or a category or classification for the application to which that the utterance 104 was provided as input. The non-linguistic context data 104 can also indicate information about the user 102 that spoke the utterance, for example, a user identifier, whether the user is male or female, or other information from a user profile for the user.

In the illustrated example, the client device 110 determines its location, for example, using a global positioning system (GPS) module or other techniques, and determines that the client device 110 is located in the city of Foster City. The client device 110 also determines that the utterance 104 was recorded as input to a mail application running on the client device 110. The client device 110 provides data indicating the location, e.g., "Foster City," and the active application, e.g., the "e-mail" application, to the computing system 120 as non-linguistic context data 116. The client device also provides the audio data 112 and the linguistic context data 114 to the computing system.

During stage (C), the computing system 120 uses a speech recognizer module 130 to determine candidate transcriptions 135 for the utterance 104. In the illustrated example, the speech recognizer module 130 indicates that the two most likely transcriptions for the audio data are "test" and "task." The candidate transcriptions 135 may be provided as, for example, a list, a word lattice, or in other forms. The candidate transcriptions 135 may be scored or ranked to indicate which candidate transcriptions 135 the speech recognizer module 130 estimates to be most likely to be correct transcriptions. In the illustrated example, the candidate transcriptions 135 represent a set of highest ranking or most likely transcriptions, as estimated by the speech recognizer 130. This set can be an n-best list, including, for example, the top 3, 5, 10, 25, or other integer number of candidate transcriptions.

In some implementations, the speech recognizer module 130 uses an acoustic model and/or a language model to identify the candidate transcriptions 135. The models used by the speech recognizer module 130 may or may not use non-linguistic context data to determine candidate transcriptions. Accordingly, in some instances, the candidate transcriptions 135 may be determined based on the audio data 112 and the linguistic context data 114, without being influenced by the non-linguistic context data 116. Another language model may use information about the non-linguistic context to re-score or re-rank the candidate transcriptions 135 to improve accuracy. In some implementations, the speech recognizer module 130 may use the non-linguistic context data 116 to identify and/or score the candidate transcriptions 135.

During stage (D), the computing system 120 uses a feature extraction module 140 to determine feature scores 145 that serve as input to the language model 150. The scores 145 correspond to different features in the language model 150. Each score 145 can be a binary value corresponding to a particular feature of the language model 150. For example, the scores 145 can indicate which of various linguistic features and/or non-linguistic features should be set as active. The scores 145 may be expressed as a vector of binary values that indicates which features in the language model are active and which are not active for a particular candidate transcription or a particular word of a candidate transcription. For example, one set of feature scores 145 can be determined for the candidate transcription "test" in the context, and another set of feature scores 145 can be determined for the candidate transcription "task" in the same context.

The feature scores 145 include a score for each of a set of linguistic features, which can represent, for example, characteristics of a language sequence that the utterance 104 occurs after. For example, the scores for linguistic features may indicate one or more words that occur in sequence prior to the words of the utterance 104. The linguistic features 210 may include n-gram features. For example, a unigram feature may indicate whether a particular word occurs immediately before the words in the utterance 104. A bigram feature may indicate whether a particular sequence of two words occurs before the utterance 104. A trigram feature may indicate whether a particular sequence of three words occurs before the utterance 104. Scores may be determined for n-gram features for any appropriate value of n, and may include scores for multiple values of n, such as a combination of unigram, bigram, and trigram features. Further, an individual feature may indicate the potential outcome being evaluated as well as a portion of the context. For example, an n-gram feature may indicate that the potential outcome "test" occurs in the context of the trigram "I have a." In some implementations, linguistic features may indicate other information regarding the lexical characteristics of prior words, such as the part of speech of one or more prior words, or whether a prior word includes a particular prefix, suffix, or other component.

The feature scores 145 can set multiple n-gram features to be active. For example, for the candidate transcription "test," the scores can activate, or set to a value of "1," (i) a unigram feature for the word "test" occurring in the unigram context of the word "a"; (ii) a bigram feature for the word "test" occurring in the bigram context of "have a"; and (iii) a trigram feature for the word "test" occurring in the trigram context of "I have a." In the feature score vector for the candidate transcription "test," n-gram features for words other than "test" and n-gram features for "test" in other contexts can be inactive, or set to a value of "0." The feature scores 145 may include scores for other features, such as non-linguistic features, as discussed with respect to FIG. 2.

During stage (E), the feature scores 145 are provided as input to a language model 150. Based on a set of feature scores 145 for a candidate transcription, the language model 150 provides an output value 155, which may indicate the likelihood that candidate transcription will occur in the current context.

The language model 150 can be a model that has been trained to estimate the likelihood of a word or phrase occurring based on scores for linguistic and/or non-linguistic features. For example, the language model 150 can determine a posterior probability of a current word, e.g., the first word of the utterance 104, given information about the context for the utterance 104, which may include linguistic context, e.g., the prior words "I have a," and/or non-linguistic context, e.g., location, device state, application, user characteristics, etc. The features used to train the language model 150 can be the same linguistic features and non-linguistic features corresponding to the feature scores 145. In other words, the feature scores 145 are determined in stage (D) for the features that the language model 150 was trained to be able to process and use to determine word likelihoods.

In some implementations, the language model 150 is a log-linear model. In some implementations, log-linear models effectively take into account scores from large numbers of features and scores for features of multiple different types. For example, a log-linear model may be used to combine word n-gram feature scores with feature scores indicating physical environment, user characteristics, and other factors. In some implementations, log-linear models and other maximum entropy models may provide greater efficiency or smaller storage requirements than, for example, hidden Markov models (HMMs) or other statistical models.

The language model 150 may include a set of internal weights that represent the training state of the language model 150. Each feature of the language model 150 can have a corresponding weight. These weights may indicate how various aspects of context make words more or less likely to occur. Typically, the weights in the language model 150 are set during training of the language model 150 and do not change during use of the language model. However, the weights are trained using examples of input from a variety of different users and different environments, so the language model 150 is able to estimate likelihoods of words occurring given different types of linguistic and non-linguistic contexts.

To determine the likelihood of a particular candidate transcription occurring in a given context, the weights corresponding to a given outcome and context are identified and used to generate the output values 155. In the illustrated example, the language model 150 has four features 152a-152d that correspond to the context "I have a." Each of the features 152a-152d indicates a different word occurring in the context, and each of the features 152a-152d has a different weight. As a result of the training of the language model 150, some weights may have positive values and some weights have negative values. Generally, among features that specify the same context, higher weights indicate a higher likelihood of occurrence. The weights are interpreted relative to the other weights associated with the same context, not on an absolute basis. Thus, a negative weight still indicates some likelihood of occurrence and indicates a difference in likelihood relative to weights having other values.

For the candidate transcription "test," the language model 150 includes a feature 152c corresponding to "test" occurring in the context. As a result, the input feature scores 145 would activate that feature 152c, and the corresponding weight (e.g., "2.0") would be used by the language model, along with weights of other activated features, to determine the likelihood that "test" is the appropriate transcription.

For the candidate transcription "task," however, the language model 150 does not include any feature corresponding to "task" occurring after the phrase "I have a." Since the language model 150 does not define this feature, there is no corresponding weight in the language model 150, and there is no corresponding input feature score 145 either. Without any other processing, the missing feature would be ignored, which would be equivalent to the missing feature having an implicit weight of "0" (e.g., exerting no influence on the calculations of the model). However, this would cause the word "task" to be considered more likely than other words actually observed in the context, if the observed words had weights with negative values. Specifically, in the illustrated example, "task" would be considered more likely to occur than the word "drink," even though the presence of the feature 152d in the language model 150 shows that the phrase "I have a drink" was observed in training data at least a minimum amount of times, while the phrase "I have a task" was not observed frequently enough to cause a feature to be included.

To deal with the missing feature for "task" in the context "I have a," the computing system 120 generates a weight appropriate for the missing feature. In some implementations, the computing system 120 dynamically determines the weight. This may occur in response to receiving the feature scores 145, or in response to determining that a feature is not included in the model. For example, the computing system 120 determines that the language model 150 does not include a feature for the word "task" in the current trigram context of "I have a." Because the feature is determined to be absent from the language model 150, the computing system 120 determines that a backoff weight should be calculated and used. The computing system 120 may determine that this feature is missing by consulting a feature dictionary that identifies the features in the model, and determining that the feature included in the feature dictionary. In addition, or as an alternative, the computing system 120 may determine that, of the feature activations indicated by the feature scores 145, there is no activated feature having a trigram context. Thus, the computing system 120 can determine that a weight to approximate a weight for the trigram context is needed.

To calculate the backoff weight for the word "task" in the trigram context, the computing system 120 determines the lowest weight for the features that represent outcomes in the current trigram context. For example, the computing system 120 may identify each of the features that represent outcomes in the current trigram context. This set of features is shown as features 152a-152d. The computing system 120 accesses the weights for the identified features 152a-152d, and identifies the minimum or lowest weight 153 for the set (e.g., the weight indicating the lowest likelihood of occurrence). The computing system 120 may apply an adjustment 154 to the lowest weight 153 to determine a backoff weight 157 to use for the word "task" occurring in the trigram context of "I have a." The adjustment 154 can, for example, further reduce the likelihood so that the backoff weight 157 for the missing feature represents a lower likelihood than any of the actual features 152a-152d in the language model 150 that have the same context.

Even though the language model 150 does not include any feature corresponding to the word "task" in the context "I have a," the language model 150 can use the backoff weight 157 as if it were the weight for the missing feature. The language model 150 uses the backoff weight 157 to provide an output score 155 for the candidate transcription "task." For example, the output score 155 may indicate a posterior probability P(y|X), or a value from which the probability may be determined, where y represents a lexical item, such as a word, number, URL, or other lexical item, and X is a vector including the feature scores 145. When determining the output score 155, the backoff weight 157 for this missing feature can be combined with weights for other features, such as a bigram feature for "task" in the context "have a" and a unigram feature for "task" in the context "a," to estimate an overall likelihood that "task" is the correct transcription for the user's speech. In the illustrated example, the language model uses the backoff weight 157 and other weights corresponding to the potential outcome "task" to generate an output score 155 of "0.3." This output score is lower than the output score 155 for the other candidate transcription, "test," and this indicates that "task" is less likely to be correct.

The techniques for generating and using a backoff weight for a missing feature can be used for multiple different amounts or types of context. For example, in addition to calculating a backoff weight for the trigram context "I have a," the computing system 120 may also determine a backoff weight for a bigram context "have a" if the language model 150 does not include a feature for "task" occurring in that bigram context. Similarly, a unigram backoff weight may be determined in the same manner if the language model 150 does not include a feature for "task" occurring in that the unigram context "a."

In some implementations, backoff weights may be generated for types of context other than n-gram contexts. For example, the language model 150 may include features and corresponding weights that represent different cities as different contexts. If the user is speaking in a city for which there is no corresponding feature, the computing system 120 may (i) identify the minimum weight among a set of weights for cities that do have features in the language model, and (ii) determine a backoff weight having a value equal to or less than the minimum weight.

During stage (F), the computing system 120 selects a transcription for the utterance 104 based on the scores 155. For example, the computing system 120 may select the candidate transcription 135 having the score 155 that indicates the highest likelihood of occurrence. In the illustrated example, the output of the language model 150 indicates that "test" is the candidate transcription 135 that is most likely to be correct.

During stage (G), the computing system 120 provides the selected transcription to the client device 102. The client device 102 then provides the transcription in the application that is running, to complete the user's intended phrase, "I have a test."

In some implementations, the input to the language model 150 may include feature scores 145 for only linguistic features. In other implementations, input feature scores may be provided for both linguistic and non-linguistic features. In some implementations, a language model that determines likelihoods using both linguistic and non-linguistic features may have better accuracy than a language model that provides scores based on only linguistic features or only non-linguistic features.

As discussed above, the language model 150 may be a log-linear model or other maximum entropy model. In some implementations, other types of models and other training techniques may additionally or alternatively be used. For example, support vector machines, neural networks, classifiers, and other types of models may be used to process various contextual features, including linguistic feature scores, non-linguistic feature scores, and/or other types of information. As an example, an integrated circuit or other device could implement a neural network to serve as a language model. As another example, a set of multiple classifiers could each be trained to process one or more feature scores, and a system could combine the outputs of the classifiers to indicate a probability of occurrence of a word or other lexical item. In general, any appropriate model may be used, where the model receives values for contextual features and provides output indicative of a likelihood of occurrence of a word based on the received values. The techniques may be useful with a variety of models. For example, these techniques may be used with parametric models or non-parametric models. For example, the techniques may be used whether the identity and/or number of parameters of the model are predefined (e.g., before training) or determined based on the training data used to train the model. For example, a log-linear language model may be defined having features determined by analysis of training data, or through the training process.

In the example of FIG. 1, the examples of candidate transcriptions 135 are individual words. The same techniques can be used to determine likelihoods of candidate transcriptions that include multiple words. For example, outputs from the language model 150 can be generated for each of the different words of a candidate transcription. An overall score indicating a likelihood of occurrence of each candidate transcription 135 as a whole. For example, to determine an overall score for the phrase for a candidate transcription "I have a test," the computing system 120 may combine scores 155 from the language model 150 for: (i) the individual word "I," (ii) the word "have" occurring after the word "I," (iii) the word "a" occurring after the words "I have," and (iv) the word "test" occurring after the words "I have a."

Figure 2:
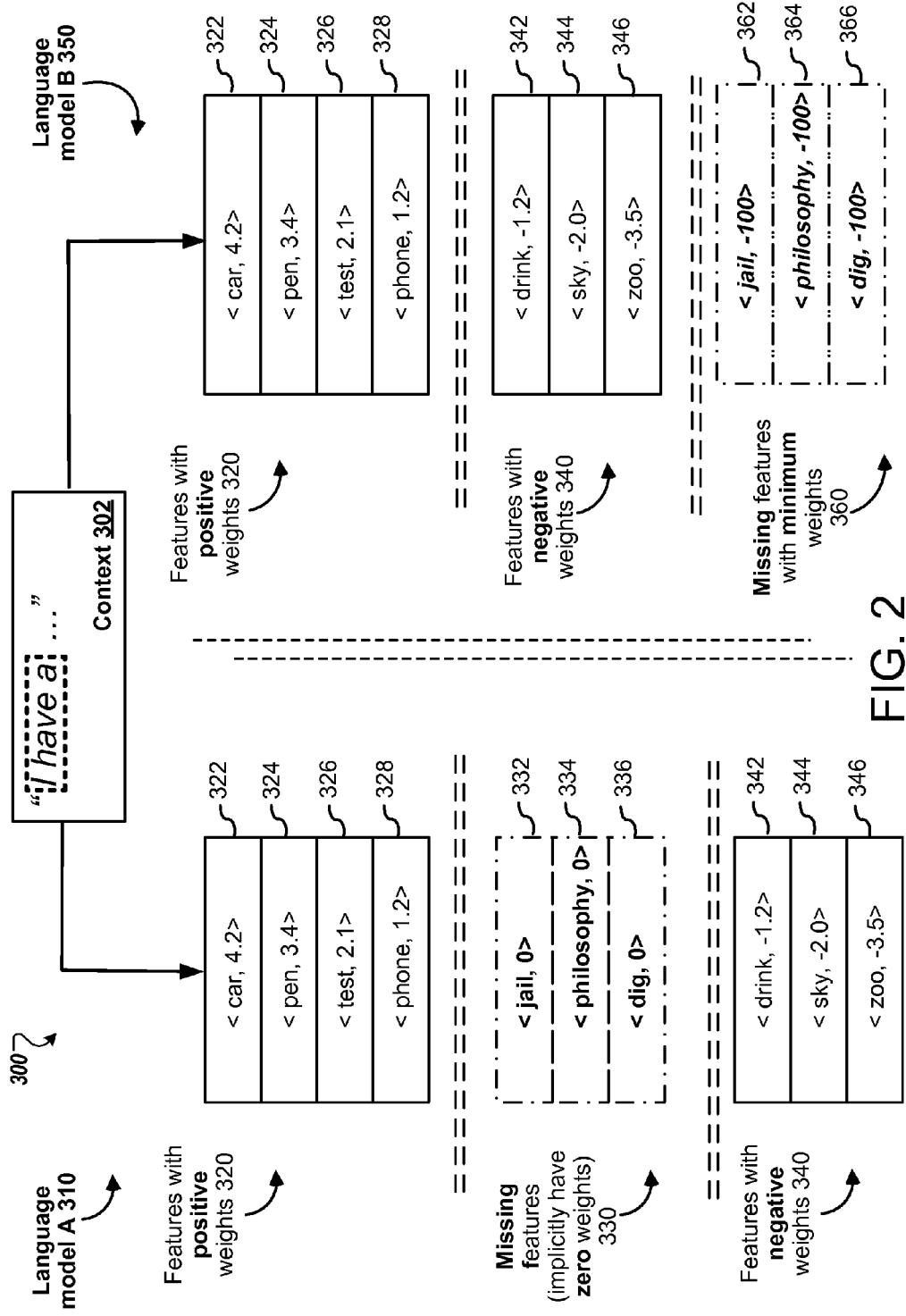
FIG. 2 is a diagram that illustrates example speech recognition processes using different language models.

FIG. 2 is a diagram that illustrates example speech recognition processes 300 using different language models.

As shown in FIG. 2, different language models (310 and 350) recognize user utterance into text by using context data (e.g., the linguistic data 114, the non-linguistic data 116, or both, as shown in FIG. 1) to recognize a next word that follows a leading phrase.

As shown in FIG. 2, the context 302 includes a linguistic context (e.g., a leading phrase "I have a"). As shown in FIG. 2, both the language model A 310 and the language model B 350 include features 310 and features 340 that correspond to the context 302. More specifically, the features 310 have been assigned positive weights and features 340 have been assigned negative weights. Since all of the features in the set correspond to the same context, the different weights or scores indicate how likely the outcome associated with one feature is relative to the outcomes associated with the other features in the set. The higher the assigned score for a feature, the more likely it is that the outcome associated with the feature will occur.

As shown in FIG. 2, features 330 and features 360 represent missing features in the language models 310 and 350, respectively. In some cases, a missing feature may be a feature not defined in a language model, or a feature present in a language model but has not been assigned a weight. Typically, a missing feature may be encountered after training, when a model attempts to evaluate a combination of an outcome and associated context, and there is no feature defined in the model that represents that combination.

In the example, for the context 302, the language models to not include a feature 332 (the potential next word "jail"), the feature 334 (the potential next word "philosophy"), and the feature 336 (the potential next word "dig"). In some instances, the absence of a feature in the model indicates that the outcome that a feature would represent did not occur in training data used to train the models 310, 350 with sufficient frequency to result in an explicit feature. For example, during training, the likelihood of occurrence of the phrase "I have a jail" was either not present in the training data, or occurred less than a minimum number of times to cause feature 332 to become part of the models 310, 350.

In the language model A 310, missing features are ignored in the calculations of the model 310, which results in the potential outcome of "jail" implicitly having weight of "0." Recall that feature weights for a given context are relative, and are indicative of likelihoods of the corresponding outcomes given the particular context. For instance, given a particular context, the outcome associated with a positive feature weight is considered more likely to occur than the outcome associated with a zero-weight feature (a feature having a weight of 0), which is in turn is considered more likely to occur than the outcome associated with a negative feature weight. Based on these principles, in the language model A 310, the outcomes associated with missing features 332-336 are considered to be less likely to occur in the context 302—than features with negative assigned weights, features 342-346.

In one such example, the word "jail" (as indicated by the zero-weight feature 332) is considered more likely to be the next word to the leading phrase "I have a" (in the context 302) than the word "drink" (as indicated by negative weight for feature 342). In other words, the model 310 is more likely to provide the candidate transcription "I have a jail" than the candidate transcription "I have a drink." In some cases, this is not a desirable outcome, because it causes the model 310 to provide an output that is inconsistent with its training. "I have a drink" was observed sufficiently during training for a corresponding feature to be defined in the model 310, while "I have a jail" was not and thus should have a lower likelihood of occurrence. Nevertheless, the output of the model 310

The language model B 350, in contrast, implements a backoff strategy, which assigns weights to missing features. The weight for a missing feature with a particular context can be based on the minimum weight for features in the model that correspond to the particular context.

As shown in FIG. 2, in the language model B 350, missing features 360 are assigned a minimum weight—rather than being implicitly treated as having a weight of "0." In some cases, a minimum weight is determined as explained at least below with respect to FIG. 3.

In some implementations, assigning weights to missing features can avoid undesirable outcomes (e.g., providing transcriptions that are less likely to be correct) arising from the typical approach of ignoring missing features.

For example, the missing feature 362 (corresponding to the potential next word "jail"), the missing feature 364 (corresponding to the potential next word "philosophy"), and the missing feature 366 (corresponding to the potential next word "dig") are not defined in the model 350 and so the language model B 350 does not include any weight for these potential outcomes. Nevertheless, when the language model B 350 is used, these missing features are assigned minimum weights of "−100," which is less than any of the weights for actual features 320, 340 that are defined in the model. In this manner, the weight for the missing feature can act as a penalty that reduces the likelihood of occurrence in the context 302 below even the lowest likelihood of occurrence that the model 350 otherwise indicates for the context 302. This ensures that outcomes unobserved in training data are indicated to have likelihoods less than that of every outcome that was observed in training data.

As a result of being assigned minimum weights "−100," the words "jail," "philosophy," and "dig" are indicated to be less likely to occur given the context 302. Accordingly, candidate transcriptions, such as "I have a jail" and "I have a dig" are less likely to be provided, compared to "I have a test" (where the feature for "test" has a positive weight) and "I have a drink" (where the feature for "drink" has a negative weight). By assigning minimum weights to missing features, in some cases, the language model B 350 is more likely to provide a correct candidate transcription than language model A 310.

Note that in the example of FIG. 2, the weight assigned to each of the missing features 362, 364, and 366 may be the same. In some implementations, the same weight is used for all missing features having the same context 302. For example, for the context 302, any word that does not have specific feature in the model 350 for the context 302 can be assigned the same backoff weight associated with the context 302.

In some implementations, the value of the backoff weight is context-dependent, for example, the backoff weight may be different for different contexts. In other implementations, a single backoff weight may be used for all contexts. For example, a universal backoff weight may be determined to be a value less than or equal to the lowest weight in the entire model 350.

The value of a backoff weight may be dynamically calculated and assigned during processing using a model. For example, the computing system 120 of FIG. 1 may calculate a backoff weight for a context each time a backoff weight is used, in response to determining that a weight for a missing feature is needed. As an alternative, backoff weights may be determined in advance and accessed from data storage during processing using a model. For example, during training or after training of a model, a system may determine and store a backoff weight for each different context represented by features in the model. These backoff weights may be later retrieved for use when processing of the model indicates that a backoff weight is needed.

Backoff weights may be calculate and used during training of a language model. In some implementations, assigning backoff weights to missing features during training can assist the model to appropriately allocate probabilities within the model. Backoff weights corresponding to different training samples may be dynamically determined for each training sample or iteration of the training process. During training, using backoff weights in the model's calculations can improve the accuracy of the adjustments to the weights in the model. Further, by incorporating the backoff weights during training, a consistent probability space can be allocated, e.g., by accounting for the non-zero probability that outcomes different from those associated with explicit features may occur. Accordingly, when the trained model is later used, the weights for features explicitly defined in the model will have been set to accurately account for the probability adjustments that backoff weights represent.

Figure 3:
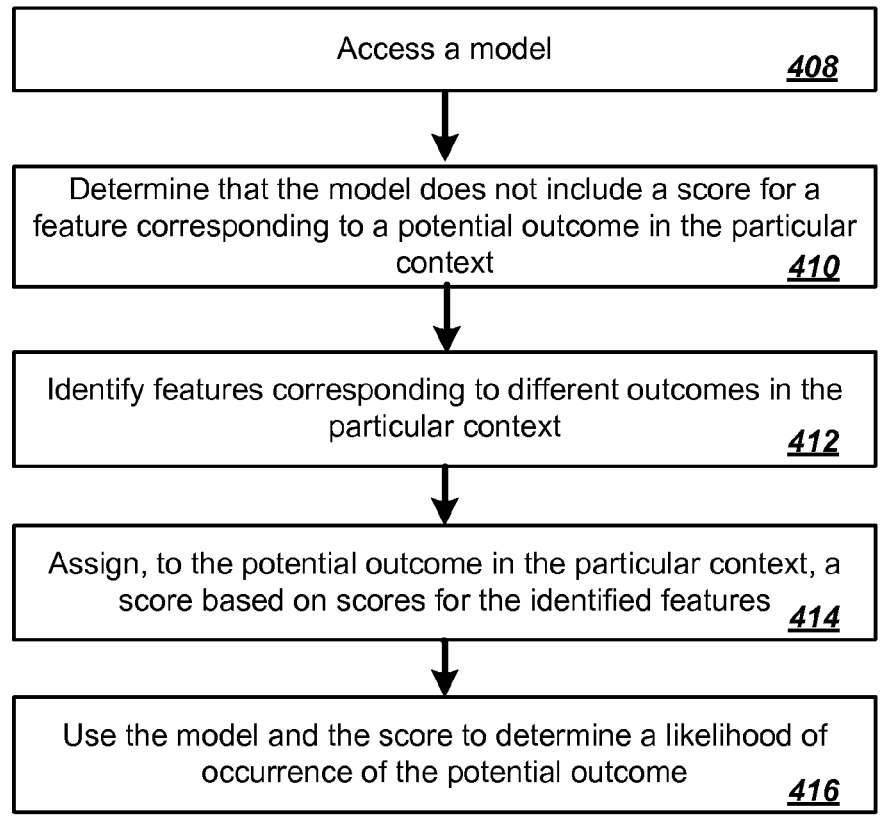
FIG. 3 is a flow diagram that illustrates an example process for dealing with missing features in a model.

FIG. 3 is a flow diagram that illustrates an example method 400 for using a backoff strategy to address missing features of a model.

In some implementations, the method 400 includes, accessing (408) a model configured to indicate likelihoods of different outcomes. For example, to provide candidate transcriptions, the system 120 or the device 110 accesses a language model indicative of likelihoods of potential next words that follow a leading phrase. In some implementations, the model is a log-linear model that indicates likelihood of a word occurring in a speech sequence, based at least in part on one or more prior words in the same speech sequence.

In some implementations, the model includes a respective score for each of a plurality of features, and each feature corresponds to an outcome in an associated context. For example, as shown in FIG. 3, the language model B 350 includes features 310 and 340, as well as scores (e.g., weights) assigned to these features. Each score indicates a likelihood of a corresponding words being the next word after the leading phrase "I have a," given the context 302.

The method 400 further includes, determining (410) that the model does not include a score for a feature corresponding to a potential outcome in a particular context. For example, it may be determined that a language model does not include a feature that represents a particular word or phrase occurring after a context that includes a sequence of one or more words. In some implementations, the determination may be made by accessing a feature dictionary that indicates the features defined in the model, and determining that the feature corresponding to the potential outcome in the particular context is not included in the feature dictionary. In some implementations, the determination may be made by determining that input to the model does not activate any features of a particular type. For example, if the particular context is a trigram of words, and input to the model does not activate any features for a trigram context, it can be determined that no feature included in the model represents the particular outcome in the trigram context.

The method 400 includes identifying (412) features in the model that correspond to different outcomes in the particular context. For example, the set of all features corresponding to the particular context can be identified. As another example, a system can identify, from among the features in the model that correspond to the particular context, the feature with the lowest score (e.g., the score indicating the lowest likelihood of occurrence).

The method 400 includes assigning (414), to the potential outcome in the particular context, a score based on scores for the identified features. In a log-linear model, the score can be a weight, e.g., a penalty weight or backoff weight. The score can be based on the minimum score assigned to features that correspond to the particular context. For example, the assigned score can be the minimum score. As another example, the assigned score can be less than the minimum score, to indicate a likelihood of occurrence less than that of the minimum score.

The method 400 includes using (416) the model and the score to determine a likelihood of occurrence of the potential outcome. For example, when using a log-linear model, this may include including the score as a weight in calculating a posterior probability, even though the weight does not have a corresponding feature in the log-linear model or a corresponding input feature scores to the log-linear model.

The determined likelihood can then be used to perform a variety of actions. For example, the likelihood can be used to select a transcription for speech, and the transcription may be provided to a user. In addition, or as an alternative, the transcription can be used as a query to generate search results to provide to the user. In machine translation, the likelihood can be used to select a translation for a portion of a document, and the translated document can be provided to a user. As another example, in pattern recognition or object recognition, the likelihood can be used to identify a matching pattern or object, or and the results can be indicated to a user.

For example, as shown in FIG. 3, minimum scores for missing features 360 are calculated based on scores of one or more features selected from features 310 and 340.

The probability indicated by a log-linear model can be expressed as follows in Equation 1:

$$P(y|x;M) = \exp(w1\_xy + w2\_xy + w3\_xy + \ldots) / \text{sum}\_y' (\exp(w1\_xy' + w2\_xy' + w3\_xy' + \ldots))$$

In equation 1, y represents a particular potential outcome to be predicted, for example, a word of a potential transcription; x represents a context in which the potential outcome may occur; M represents the training state of the log-linear model, e.g., the overall set of weights in the model. Thus, $P(y|x; M)$ indicates the posterior probability of outcome y occurring in context x, according to the training state of the model M. Further, exp( ) denotes the exponential function, and "$w1\_xy + w2\_xy + w3\_xy + \ldots$" represents the set weights of all features in the model that would be activated in the event of the occurrence of outcome y in context x. The term y' denotes a variable representing one of the set of potential outcomes that the model recognizes may possibly occur, and so the term sum_y'( ) denotes a summation over all potential outcomes. Further, "w1_$xy'$+w2_$xy'$+w3_$xy$∝+ . . . " represents the set of weights of all features of the model that would be activated for the occurrence of the outcome specified by y' in the context x. As a result, the denominator of the fraction in equation 1 represents the sum of exponential functions applied to the sets of activated weights corresponding to each potential outcome that model indicates may occur in the context x.

A minimum weight for a context x, denoted as min_$xy_i$, can be defined as follows according to Equation 2:

$$\min\_xy_i = \min\_y'(\{wi\_xy'\}, -\text{lambda}) - \text{epsilon}$$

In Equation 2, {wi_xy'} represents the set of weights for all possible outcomes that the features of the model indicate may occur in the context x. The term min_y' is a minimum value operator, which selects the minimum value in the set {wi_xy'} or the value of −lambda, whichever is lower. Lambda and epsilon are constants. In some cases, the value of epsilon is a non-negative (e.g., a positive constant or zero), and in some instances the value of epsilon may be negative. Similarly, the value of lambda may be non-negative (e.g., a positive constant or zero), and in some instances the value of lambda may be negative. In some cases, the Lambda is a parameter independent of the weights and may be configured to force a minimum value to min_$xy_i$.

Numerous variations to Equation 2 may be made. For example, lambda or epsilon or both may be omitted. As another example, the value of lambda and/or epsilon may vary based on the context. For example, the values of lambda and/or epsilon may be different depending on whether the context represents a different amount of context (e.g., trigram, bigram, unigram, or other n-gram amount of context), or whether the context is an aspect of linguistic or non-linguistic context. Further, the use of the lambda and epsilon may be different. For example, rather than select the minimum from negative lambda and the minimum of the set indicated above, the value of lambda may simply be subtracted from the minimum value in the set.

A function can be used to define the weight for a feature so that if there is a weight in the model for the feature, the weight is used. Otherwise, the minimum weight min_$xy_i$ is used, as shown in Equation 3:

```
wi'_xy:
    if (wi'_xy is a parameter or feature in the model) then
        wi'_xy = wi_xy;
    else
        wi'_xy = min_xyi;
```

The function defined in Equation 3 can be used to replace each weight in Equation 1, resulting in an objective function for the model as defined as follows in Equation 4:

$$P(y|x;M) = \exp(w1'\_xy + w2'\_xy + w3'\_xy + \ldots)/\text{sum}\_y'$$
$$(\exp(w1'\_xy' + w2'\_xy' + w3'\_xy' + \ldots))$$

In some cases, the method 400 is used to transcribe a user utterance into text. In these cases, given a particular context, the different outcomes that the model is trained to predict may be different words or phrases corresponding to features present in the model, such as words or phrase observed in a set of training data used to train the model. In these cases, a potential outcome being predicted by the model is a word or phrase in a candidate transcription.

In some implementations, the model has been trained, based on a set of training data, to indicate a likelihood of a word occurring in a speech sequence based at least in part on one or more prior words in the speech sequence.

In other words, in some cases, a language model indicates how likely (or unlikely) a word occurs in a speech sequence, based on linguistic context, non-linguistic context, or both.

In some implementations, the scores for the identified features are weights associated with the identified features. For example, for a particular context, each potential outcome identified by a feature is assigned a weight: a positive weight, a negative weight, or a minimum weight.

In some implementations, the different outcomes correspond to words observed in training data used to train the language model. In some implementations, the potential outcome identifies one or more words that have not been observed in the particular context in accordance with training data stored in the model. For example, in some cases, a potential outcome corresponds to a missing feature in a language model, which is either (a) absent in the language model or (b) present in the language model but has not been assigned a score. For example, as shown in FIG. 3, the potential next words "jail," "philosophy," and "dig" have not been identified, by the language model B 350 (or training data stored therein), as being the next word in the context 302.

In some implementations, the method 400 optionally includes: determining the score for the potential outcome in the particular context by subtracting a predefined value from the value. For example, as shown in the Equation 3, minimum scores are assigned to missing features based on scores of features associated with the particular context and a positive constant value (the epsilon in the Equation 2).

In some cases, the positive constant value (e.g., 0.1, 1, 2, 5.5, etc.) is determined based on empirical data and thus suffices to mathematically render an outcome that has not been observed, a less likely outcome than an outcome that has been observed, according to the language models' training data.

For example, as shown in FIG. 3, in the language model B 350, the candidate transcription ("I have a dig") corresponds to a missing feature 366 and is thus considered a less likely outcome than the transcription ("I have a drink").

In some cases, the underlying principle is that, for a given context, an outcome that has not been observed before (e.g., a missing feature) ought to be considered a less likely outcome than an outcome that has been observed before, regardless the likelihoods of the latter (e.g., a positive feature weight or negative feature weight).

For example, as shown in FIG. 3, in the context 302, the transcription ("I have a drink") is considered unlikely, due to its assigned negative score; the candidate transcription ("I have a dig"), however, is considered even more unlikely (or even less likely), due to its assigned minimum score.

In some implementations, the score assigned to the potential outcome in the particular context is an n-gram backoff score. For example, in place of a score for a feature representing the full sequence (e.g., the context plus the word that the potential outcome represents) the score may be used instead, as backing off to represent a shorter language sequence (e.g., the context alone).

In some implementations the method 400 is executed in a speech recognition system, and optionally includes: obtaining audio data for an utterance by a user; and determining a plurality of candidate transcriptions for the audio data in accordance with the model and the assigned score.

For example, in some implementations, the method 400 optionally includes: transcribing the audio data into a speech sequence having one or more words; determining the particular context in accordance with the one or more words; and determining a next word in the speech sequence based on the likelihood of occurrence of the potential outcome.

In some implementations, weights for missing features are calculated dynamically as the model is used. For example, when using a language model, the determining step (410), the identifying step (412), and the assigning step (414) can occur after receiving audio data indicating a user utterance. In other words, an appropriate score for the missing feature is calculated each time the score for the missing feature is needed to recognize an utterance. By dynamically re-determining the value of the weight for a missing feature, the weight can be calculated correctly based on the current training state and current weights of the model. Accordingly, this technique can calculate accurate weights for missing features during training iterations, when the weights of the model are being adjusted. Further, when a model in use is upgraded to a new training state, no changes are needed to the techniques for calculating weights for missing features.

In some implementations, weights that can be used for missing features are determined and stored prior to use of the model to estimate likelihoods. For example, when recognizing speech, a set of scores for any missing features can be determined prior to obtaining audio data for the utterance to be recognized. When ahead-of-time processing is enabled, the identifying step (412) and the assigning step (414) occur before and in anticipation of identifying an input that corresponds to a missing feature from the language model. Thus, when input for the model indicates a potential outcome and a context that correspond to a missing feature, a previously stored score associated with the context can be accessed and used.

A system may determine and store a "missing feature" score, e.g., a penalty score or backoff score, for each of the contexts of features in the model. For example, after training a model, the system may access a list of features defined in the model. From the list of features, the system may identify each of the unique contexts. In language modeling, n-grams of different lengths may be considered different contexts. For each particular context identified, the system determines the minimum weight among all the defined features that correspond to that particular context. For example, for the unigram context "a," features may be defined for "car" in the context of "a," "person" in the context of "a," and so on, and the minimum weight among all these features is identified. A minimum weight is determined for each of the other contexts also. The system can then generate a missing feature weight by, for example, subtracting a constant from the minimum weight determined for each context. Then, the missing feature weights are stored in association with their respective contexts. This missing feature weight can be used as a "catch all" weight for its associated context. Thus, if input to the model represents a scenario having an observed context but an unobserved potential outcome, the missing feature weight may be used as if it were a weight for the missing feature. For, example, to determine the likelihood of "the" following the word "a," the system can determine that there is no explicitly defined feature for this language sequence, and in response, can access the stored missing feature weight for the context "a" to determine the likelihood of occurrence of the word "the" following the word "a."

This ahead-of-time process functionality can be advantageous, as it may reduce run-time processing time, thereby rendering a speech recognition system or other system that is more responsive to user utterances or requests during run time.

In some implementations, as discussed above, a backoff score can be used as a weight for a missing feature in a model, as if the model included the backoff score as a weight for the missing feature. In other implementations, a pre-computed minimum weight or backoff score for each context can be subtracted from every active feature weight. For example, after training the model and pre-computing the missing feature weights for each context, each weight in the model can have the missing feature weight for its associated context subtracted from the weight. For example, if training caused the weight for a particular feature to have a value of "2," and the missing feature weight for the context of the particular feature was "−1," a modified weight for the particular feature may be set as 2−(−1)=3. Using the modified feature weights would effectively boost the likelihood for features that are activated during prediction using the model. When a scenario of a missing feature is encountered by the model, rather than add a weight for a missing feature during calculation by the model, the absence of a weight for an activated feature for the context would be equivalent to adding back in the missing feature weight for the context.

In some implementations, determining the score for a missing feature can be based on an identification and analysis of all (as opposed to a proper subset of) features associated with a context. For example, the features identified at the identifying step (412) may constitute an exhaustive set of the features defined in the model that are associated with the particular context. For example, all features identified as relevant to a particular context are identified, and scores for missing features are determined based on the minimum score among the scores of all these features.

In some cases, the values of the missing feature scores are context-dependent. In other words, the missing feature score for a potential outcome, such as a particular word or phrase, may be different scores under different contexts. When contexts are different, different sets of features are identified for scoring a missing feature, resulting in a different minimum weight for each set.

In some implementations, a training process for the model is provided. In some cases, the model is trained, in order to set the values of weights corresponding to the features defined for the model. The training may be carried out using, for example, a stochastic gradient descent process or other techniques. During training, calculations of the model can use dynamically generated weights to represent weights for features not defined in the model, as described above. This is technically advantageous, as when the missing feature scores are accounted for during training, the probability space is appropriately allocated so that, during use of the trained model, using missing feature scores will produce accurate output from the model.

Figure 4:
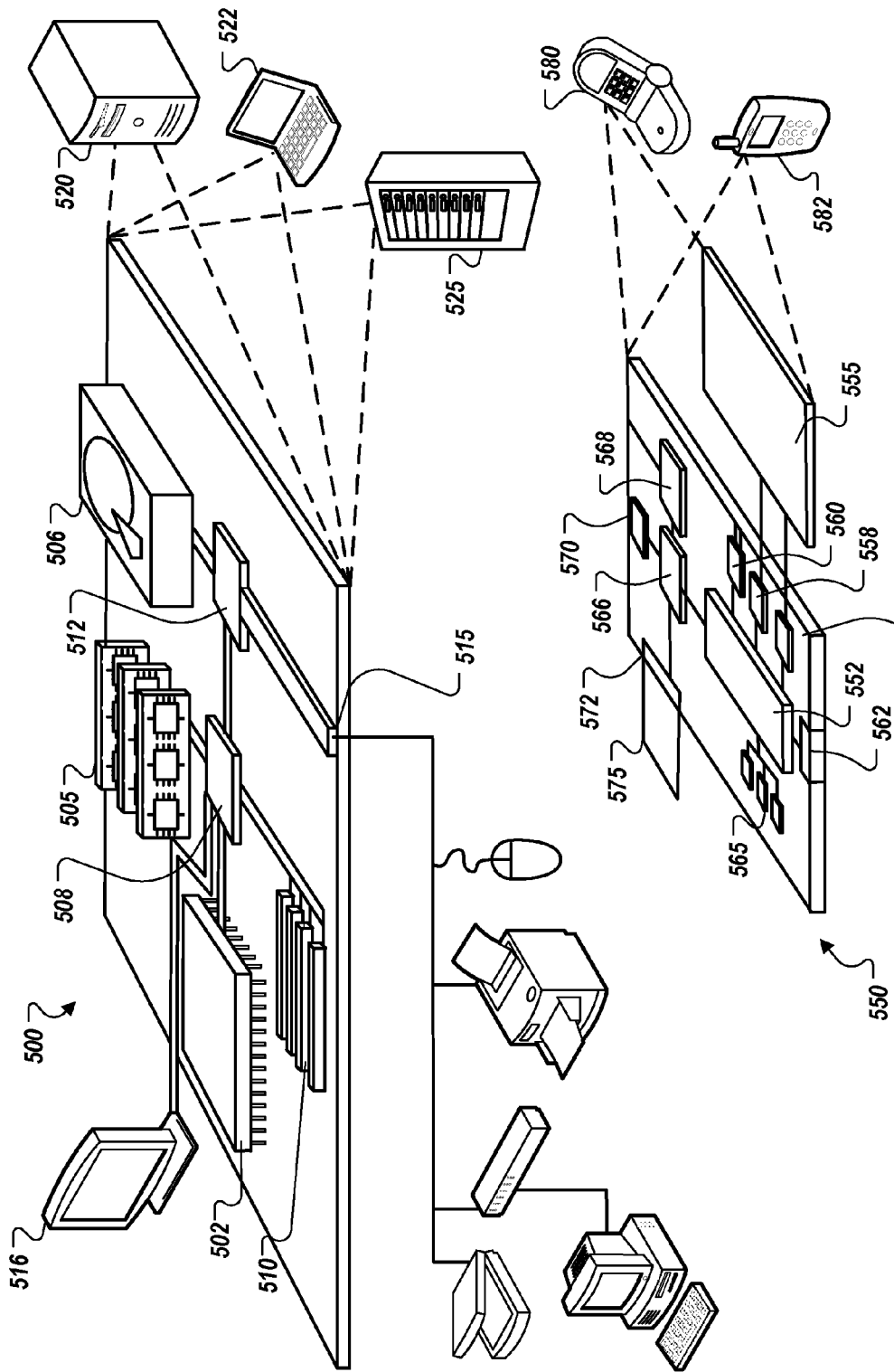
FIG. 4 is a schematic diagram that shows an example of a computing device and a mobile computing device.

FIG. 4 shows an example of a computing device 500 and an example of a mobile computing device 550 that can be used to implement the techniques described above. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 505, a storage device 506, a high-speed interface 508 connecting to the memory 505 and multiple high-speed expansion ports 510, and a low-speed interface 512 connecting to a low-speed expansion port 515 and the storage device 506. Each of the processor 502, the memory 505, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 505 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 505 stores information within the computing device 500. In some implementations, the memory 505 is a volatile memory unit or units. In some implementations, the memory 505 is a non-volatile memory unit or units. The memory 505 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 505, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 505, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 515. The low-speed expansion port 515, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 525. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 565, an input/output device such as a display 555, a communication interface 566, and a transceiver 568, among other components. The mobile computing device 550 may also be provided with a storage device, such as a micro-drive or other device, to provide additional storage. Each of the processor 552, the memory 565, the display 555, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 565. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 555. The display 555 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 555 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 565 stores information within the mobile computing device 550. The memory 565 can be implemented as one or more of a computer-readable medium or media, a volatile memory unit or units, or a non-volatile memory unit or units. An expansion memory 575 may also be provided and connected to the mobile computing device 550 through an expansion interface 572, which may include, for example, a SIMM (Single In Line Memory Module) card interface. The expansion memory 575 may provide extra storage space for the mobile computing device 550, or may also store applications or other information for the mobile computing device 550. Specifically, the expansion memory 575 may include instructions to carry out or supplement the processes described above, and may include secure information also. Thus, for example, the expansion memory 575 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 565, the expansion memory 575, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, tablet computer, wearable computer, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method performed by one or more computers of an automated speech recognition system, the method comprising:
   receiving data indicating a candidate transcription for an utterance and a particular context for the utterance;
   accessing a language model of the automated speech recognition system, the language model including a respective score for each of a plurality of features, each feature corresponding to a word or phrase occurring in an associated context that includes one or more preceding words, wherein the automated speech recognition system is configured to obtain a score for a feature such that:
      (i) if the language model includes a score for the feature, the one or more computers retrieve the score for the feature that is included in the language model, and
      (ii) if the language model does not include a score for the feature, the one or more computers obtain a score for the feature that is based on scores for other features associated with a same context as the feature;
   determining that the language model does not include a score for a feature corresponding to the candidate transcription in the particular context;
   in response to determining that the language model does not include a score for a feature corresponding to the candidate transcription in the particular context, operating the automated speech recognition system to obtain a score corresponding to the candidate transcription in the particular context, wherein the score is determined based on one or more scores included in the language model for one or more of the plurality of features that are associated with the particular context;
   determining, using the language model and the determined score, a probability score indicating a likelihood of occurrence of the candidate transcription in the particular context;
   selecting, based on the probability score, a transcription for the utterance from among a plurality of candidate transcriptions; and
   providing the selected transcription to a client device as output of the automated speech recognition system.

2. The method of claim 1, wherein the language model is a log-linear model.

3. The method of claim 1, wherein determining the score corresponding to the candidate transcription in the particular context comprises:
   identifying features in the language model that correspond to different words or phrases occurring in the particular context; and
   accessing scores in the language model for the identified features.

4. The method of claim 3, wherein the identified features constitute an exhaustive set of features of the model that are associated with the particular context.

5. The method of claim 3, wherein determining the score corresponding to the candidate transcription in the particular context further comprises:
   identifying the minimum score from among the accessed scores for the identified features; and determining the score corresponding to the candidate transcription in the particular context based on the identified minimum score.

6. The method of claim 5, wherein determining the score corresponding to the candidate transcription in the particular context comprises determining the score by subtracting one or more predefined values from the minimum score.

7. The method of claim 3, wherein (i) identifying the features in the language model that correspond to different words or phrases occurring in the particular context and (ii) accessing the scores for the identified features are performed in response to determining that the language model does not include a score for a feature corresponding to the candidate transcription in the particular context.

8. The method of claim 3, wherein (i) identifying the features in the language model that correspond to different words or phrases occurring in the particular context and (ii) accessing the scores for the identified features are performed prior to receiving the candidate transcription for the utterance.

9. The method of claim 1, wherein determining the score corresponding to the candidate transcription in the particular context comprises:
accessing a stored score that is assigned to the particular context, the stored score being assigned to the particular context prior to the utterance being spoken; and
using the stored score as the score corresponding to the candidate transcription.

10. The method of claim 1, wherein determining the score corresponding to the candidate transcription in the particular context comprises determining a score indicating a likelihood of occurrence that is less than or is equal to the lowest likelihood of occurrence indicated by scores in the language model that are assigned to features that correspond to the particular context.

11. The method of claim 1, wherein the language model is a log-linear model, and wherein accessed scores for the identified features are weights of the log-linear model that are associated with the identified features.

12. The method of claim 1, wherein the language model has been trained to indicate a likelihood of a word or phrase occurring in a language sequence based at least in part on one or more prior words in the language sequence.

13. The method of claim 1, wherein each of the plurality of features corresponds to a respective language sequence that occurs in training data that was used to train the language model; and
wherein the candidate transcription and the particular context form a language sequence that was not included in the training data that was used to train the model.

14. The method of claim 1, further comprising:
pre-computing a minimum score for each of multiple contexts while training the language model; and
normalizing scores for features in the language model using the pre-computed minimum scores.

15. An automated speech recognition system comprising:
one or more computers and one or more storage devices storing instructions that are operable, when executed by the one or more computers, to cause the one or more computers to perform operations comprising:
receiving data indicating a candidate transcription for an utterance and a particular context for the utterance;
accessing a language model of the automated speech recognition system, the language model including a respective score for each of a plurality of features, each feature corresponding to a word or phrase occurring in an associated context that includes one or more preceding words, wherein the automated speech recognition system is configured to obtain a score for a feature such that:
(i) if the language model includes a score for the feature, the one or more computers retrieve the score for the feature that is included in the language model, and
(ii) if the language model does not include a score for the feature, the one or more computers obtain a score for the feature that is based on scores for other features associated with a same context as the feature;
determining that the language model does not include a score for a feature corresponding to the candidate transcription in the particular context;
in response to determining that the language model does not include a score for a feature corresponding to the candidate transcription in the particular context, operating the automated speech recognition system to obtain a score corresponding to the candidate transcription in the particular context, wherein the score is determined based on one or more scores included in the language model for one or more of the plurality of features that are associated with the particular context;
determining, using the language model and the determined score, a probability score indicating a likelihood of occurrence of the candidate transcription in the particular context;
selecting, based on the probability score, a transcription for the utterance from among a plurality of candidate transcriptions; and
providing the selected transcription to a client device as output of the automated speech recognition system.

16. The automated speech recognition system of claim 15, wherein the language model is a log-linear model.

17. The automated speech recognition system of claim 16, wherein determining the score corresponding to the candidate transcription in the particular context comprises determining a score indicating a likelihood of occurrence that is less than or is equal to the lowest likelihood of occurrence indicated by scores in the language model that are assigned to features that correspond to the particular context.

18. A non-transitory computer readable storage medium storing instructions that, when executed by one or more computers of an automated speech recognition system, cause the one or more computers to perform operations comprising:
receiving data indicating a candidate transcription for an utterance and a particular context for the utterance;
accessing a language model of the automated speech recognition system, the language model including a respective score for each of a plurality of features, each feature corresponding to a word or phrase occurring in an associated context that includes one or more preceding words, wherein the automated speech recognition system is configured to obtain a score for a feature such that:
(i) if the language model includes a score for the feature, the one or more computers retrieve the score for the feature that is included in the language model, and
(ii) if the language model does not include a score for the feature, the one or more computers obtain a score for the feature that is based on scores for other features associated with a same context as the feature;

determining that the language model does not include a score for a feature corresponding to the candidate transcription in the particular context;

in response to determining that the language model does not include a score for a feature corresponding to the candidate transcription in the particular context, operating the automated speech recognition system to obtain a score corresponding to the candidate transcription in the particular context, wherein the score is determined based on one or more scores included in the language model for one or more of the plurality of features that are associated with the particular context;

determining, using the language model and the determined score, a probability score indicating a likelihood of occurrence of the candidate transcription in the particular context;

selecting, based on the probability score, a transcription for the utterance from among a plurality of candidate transcriptions; and providing the selected transcription to a client device as output of the automated speech recognition system.

19. The non-transitory computer readable storage medium of claim 18, wherein the language model is a log-linear model.

20. The non-transitory computer readable storage medium of claim 19, wherein determining the score corresponding to the candidate transcription in the particular context comprises determining a score indicating a likelihood of occurrence that is less than or is equal to the lowest likelihood of occurrence indicated by scores in the language model that are assigned to features that correspond to the particular context.

* * * * *